(12) United States Patent
Guehring et al.

(10) Patent No.: US 6,213,692 B1
(45) Date of Patent: Apr. 10, 2001

(54) CUTTING TOOL

(75) Inventors: Joerg Guehring, Fran-Schubert-Strasse 18, 72458 Albstadt; Tibor Cselle, Sigmaringen, both of (DE); Johann Rechberger, Bern (CH)

(73) Assignees: Vilab AG, Bern (CH); Joerg Guehring, Albstadt (DE)

( * ) Notice: Subject to any disclaimer, the term of this patent is extended or adjusted under 35 U.S.C. 154(b) by 0 days.

(21) Appl. No.: 08/930,246

(22) PCT Filed: Mar. 28, 1996

(86) PCT No.: PCT/EP96/01374

§ 371 Date: Dec. 4, 1997

§ 102(e) Date: Dec. 4, 1997

(87) PCT Pub. No.: WO96/30148

PCT Pub. Date: Oct. 3, 1996

(30) Foreign Application Priority Data

| Mar. 30, 1995 | (DE) | 195 11 828 |
| Mar. 30, 1995 | (DE) | 195 11 829 |
| Jan. 31, 1996 | (DE) | 296 01 653 U |

(51) Int. Cl.$^7$ .................................................. B23B 51/02
(52) U.S. Cl. .......................... 408/144; 408/223; 408/230
(58) Field of Search .................................... 408/144, 223, 408/224, 227, 229, 230, 145; 407/53

(56) References Cited

U.S. PATENT DOCUMENTS

| 3,945,807 | * | 3/1976 | Fukutome | 408/144 |
| 4,802,799 | | 2/1989 | Rachev . | |
| 4,826,365 | | 5/1989 | White . | |
| 5,011,342 | | 4/1991 | Hsu . | |
| 5,160,232 | | 11/1992 | Maier . | |
| 5,312,209 | * | 5/1994 | Lindblom | 408/230 |
| 5,452,971 | * | 9/1995 | Nevills | 408/230 |
| 5,509,761 | * | 4/1996 | Grossman et al. | 408/230 |

FOREIGN PATENT DOCUMENTS

| 84413 | 3/1895 | (DE) . | |
| 1 017 438 | 10/1957 | (DE) . | |
| 1 296 805 | 6/1969 | (DE) . | |
| 2 021 688 | 8/1972 | (DE) . | |
| 2 357 134 | 11/1973 | (DE) . | |
| 2 240 646 | 11/1974 | (DE) . | |
| 25 05 555 | 8/1975 | (DE) . | |
| 202 898 | 10/1983 | (DE) . | |
| 31 31 794 | 8/1986 | (DE) . | |
| 36 28 262 | 1/1988 | (DE) . | |
| 37 04 106 | 8/1988 | (DE) . | |
| 37 30 377 | 3/1989 | (DE) . | |
| 37 30 378 | 3/1989 | (DE) . | |
| 38 26 239 | 2/1990 | (DE) . | |
| 99 549 | 3/1997 | (DE) . | |
| 99549 | 3/1997 | (DE) . | |
| 714611 | * 11/1931 | (FR) | 408/224 |
| 2650299 | * 2/1991 | (FR) | 408/144 |
| 660 129 | 10/1951 | (GB) . | |
| 2 201 910 | 9/1988 | (GB) . | |
| 48413 | * 3/1987 | (JP) | 408/144 |
| 216706 | * 8/1989 | (JP) | 408/144 |
| 1060344 | * 12/1983 | (SU) | 408/230 |
| 1812003 | * 4/1993 | (SU) | 408/230 |
| WO 89/02328 | 3/1989 | (WO) . | |

OTHER PUBLICATIONS

"Machining Tools for Special Purpose Machine Engineering and Automatic Production Cycle Lines", pp. 67 and 68, 1972.

* cited by examiner

*Primary Examiner*—Daniel W. Howell
(74) *Attorney, Agent, or Firm*—Oblon, Spivak, McClelland, Maier & Neustadt, P.C.

(57) ABSTRACT

A cutting tool, especially a drill, milling cutter, screw tap, reamer and core drill, comprising a shaft and a cutting member on which at least one cutting edge is provided for machining a workpiece, the cutting member being provided with a slide layer which has a lower hardness than a base layer of the cutting member.

37 Claims, 5 Drawing Sheets

CUTTING TOOL

The invention relates to a cutting tool such as a drill, milling cutter, screw tap, reamer or core drill in accordance with the preamble of claim 1.

The use of numerically controlled machine tools has been a substantial contribution to increasing the productivity, flexibility, manufacturing quality and efficiency of modern production apparatuses. The versatile possibilities of control technique and information processing have been responsible for machine designs suited for use in automatic manufacturing systems. Systems of this kind are usually equipped with tool and workpiece storage means, automatic changing means and integrated measuring stations so that the steps to be manually taken by the machine operator are minimized. Sensors for monitoring machine functions and process states, such as wear and breakage of tools, ensure the automatic manufacturing sequence. In order to be able to exploit the full capacity of such machine tools, in parallel with the development of machine tools also appropriate tools have to be provided which permit a prolonged tool life as well as an increase in the cutting speeds so that the manufacturing times can be reduced to a minimum. However, in the case of modern machining processes the increase in the cutting speed need not necessarily be of major importance, but with particular applications, such as the machining of light metals, for instance, it may be endeavored to dispense with coolants and lubricants or at least to reduce the use thereof and, on the other hand, to accept a reduced cutting speed.

In the case of tools having geometrically defined cutting edges, such as, e.g., drills, milling cutters, reamers, screw taps, core drills etc., preferably high-alloy tool steels, hard metals, i.e. sintered materials of metallic hard materials such as, for instance, cermet, ceramic insert, monocrystalline diamond, polycrystalline diamond, polycrystalline boron nitride etc. are employed as cutting materials.

Moreover, there are known tools in which the wear resistance of the tools is further increased by coating them with hard material layers, such as, e.g., titanium nitride, titanium carbide and aluminium oxide.

In DE-OS 23 57 134 a cutting tool is disclosed in which a coating film of precious metal is applied by an ion-plating method. DE-AS 12 71 495 relates to a method of manufacturing a cutting tool in which a cover layer of copper or brass is applied to the portions not to be hardened prior to a hardening operation.

The cutting tools known from the two a.m. publications have the common drawback that, on the one hand, the cover layers consist of comparatively expensive materials and the tool lives are improvable, especially when light metals are processed.

The continuous development of the machine tools and the use of novel methods, such as dry machining, for instance, where the workpieces are machined without using coolants/lubricants or machining with reduced amounts of coolant, and the endeavor to obtain more and more reduced manufacturing tires make requirements to the tools as regards the tool lives and the maximum obtainable cutting speeds which cannot be fully met by conventional tools.

The object underlying the invention is to provide a cutting tool which has a simple design and permits an improved tool life while, at the same time, the cutting speed is increased or the amount of coolant is reduced.

This object is achieved by the features of claim 1.

The tool wear can be considerably reduced by the measure to apply a soft slide layer containing sulphides, selenides, tellurides, such as, e.g., $MoS_2$, $NbS_2$, $TaS_2$, $WS_2$, $MoSe_2$, $NbSe_2$, $TaSe_2$, $WSe_2$, $MoTe_2$, $NbTe_2$, $WTe_2$ or mixed compounds, to the cutting tool, because the chip slides off the soft slide layer and thus the face wear is reduced and the formation of a built-up edge is prevented. Moreover, the friction between the tool and the open face is minimized so that the wear of the open face is reduced, too. Thus the tool life can be considerably improved by the slide layer according to the invention compared to conventional solutions. There are already known some coating methods for applying wearing coats to cutting tools so that a respective description is dispensed with. A method of the co-applicant VILAB AG/Switzerland has turned out to be especially suited.

It is of particular advantage to apply the soft slide layer to a wear-resisting base layer which, in turn, has been applied to the base body of the cutting tool so that the latter is provided with two layers.

In order to ensure an optimum machining operation, the soft slide layer is not applied in the area of the cutting edge.

It is especially advantageous when the base body of the cutting tool is made of HSS, hard metal, cermet or ceramic material and the wear-resisting layer consists of TiN, TiAlN, TiCN, diamond or the like.

Depending on the application, it is preferred to apply the base layer in a thickness of 1–10 $\mu$, while the hardness of the base layer should be between 2000–10000 UV and the slide layer should have a Mohs' hardness of 1–2.

The measure to form one or a plurality of grooves, especially in grooved shape, in the flute promotes breakage of chips so that the formation of long flowing chips, which interfere with the operating cycle, e.g. in automatic machine tools, and impede the chip removal, is prevented. With the short discontinuous chips a high surface quality is guaranteed, while the chips can easily be removed. Moreover, in the case of wet machining the groove facilitates the supply of coolants and lubricants to the cutting portion of the tool so that the stability thereof is increased and the carrying-off of the chip is further facilitated.

Preferably a plurality of grooves extending along the flute at parallel distance is formed in the face.

The chip formation and the chip discharge can be further improved by providing also the open space with groove-like recesses extending away from the cutting edge. The supply of coolant and lubricant, too, can be further improved by such recesses compared to the above-described embodiment.

The chip capacity and the tool times of such a tool are superior to those of conventional tools, even if the workpieces are machined in a dry state or with reduced supply of coolant.

In case that the cutting edge is formed at the front of the cutting member, such as, e.g., in drills, face mills, core drills etc., the recesses are advantageously formed as segments of a circle or spiral on the open face which are positioned approximately concentrically with respect to the axis of the cutting tool.

The chip formation and the supply of coolant and lubricant can be further improved by the fact that a recess is associated with each groove so that the recess is practically arranged in extension of a groove.

In special cases of application it may be advantageous to form the grooves or recesses only over a partial area of the flute and the open space, respectively.

It has proved especially advantageous when the width and the depth of the grooves and/or the recesses is between 0.02–2 mm, preferably 0.02–0.5 mm.

Further advantageous developments of the invention are described in the subclaims.

In the following, preferred embodiments of the invention are explained in detail by way of schematic drawings.

Figure 1:
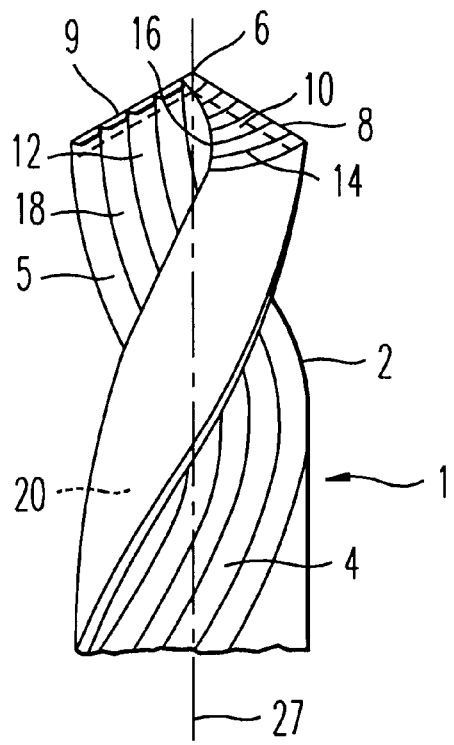
FIG. 1 is a view of the cutting member of a twist drill.

FIG. 1 shows the cutting member 2 of a twist drill 1 which has two spiral flutes 4, 5 extending along the cutting member 2 to the bit 6 of the drill. Each major cutting edge 8, 9 is formed at a wedge which, on the one hand, is formed by an open face 10 and, on the other hand, by a face 12 of the flute 5.

Moreover, in the shown embodiment groove-like recesses 14 extending concentrically from the major cutting edge 8 (9) to the rear edge 16 of the open face are formed in the open face 10.

In each flute 4, 5 a plurality of adjacent grooves 18 is formed the axis of which is disposed approximately in parallel to the axis of the flute 5 (4), i.e. the grooves 18 extend likewise spirally about the axis 20 of the drill 1. As regards further details about the design of the grooves 18 and the recesses 14, reference is made to FIGS. 2 and 5.

Figure 3:
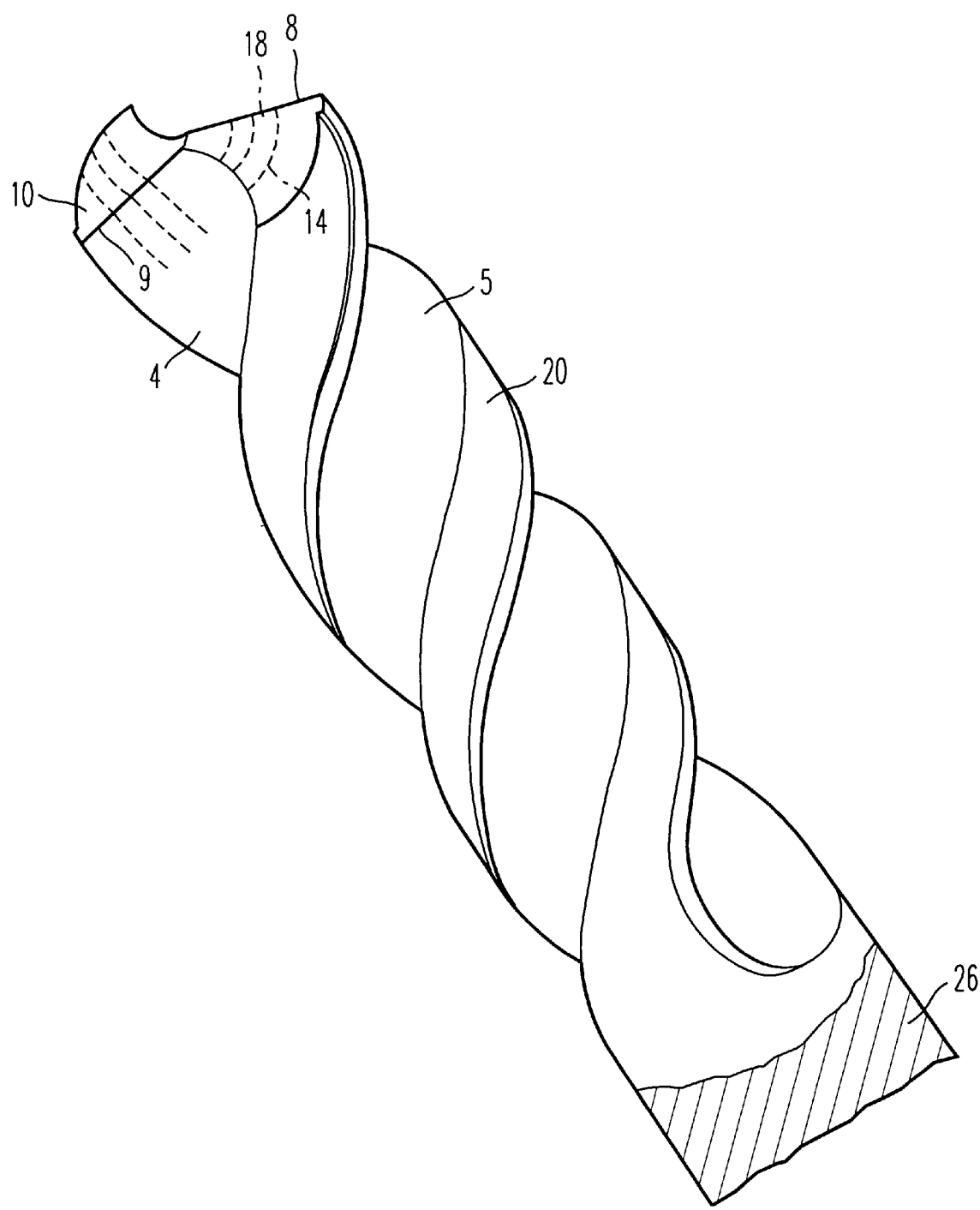
FIG. 3 is a three-dimensional sectional view of a cutting tool according to the invention.
Figure 6:
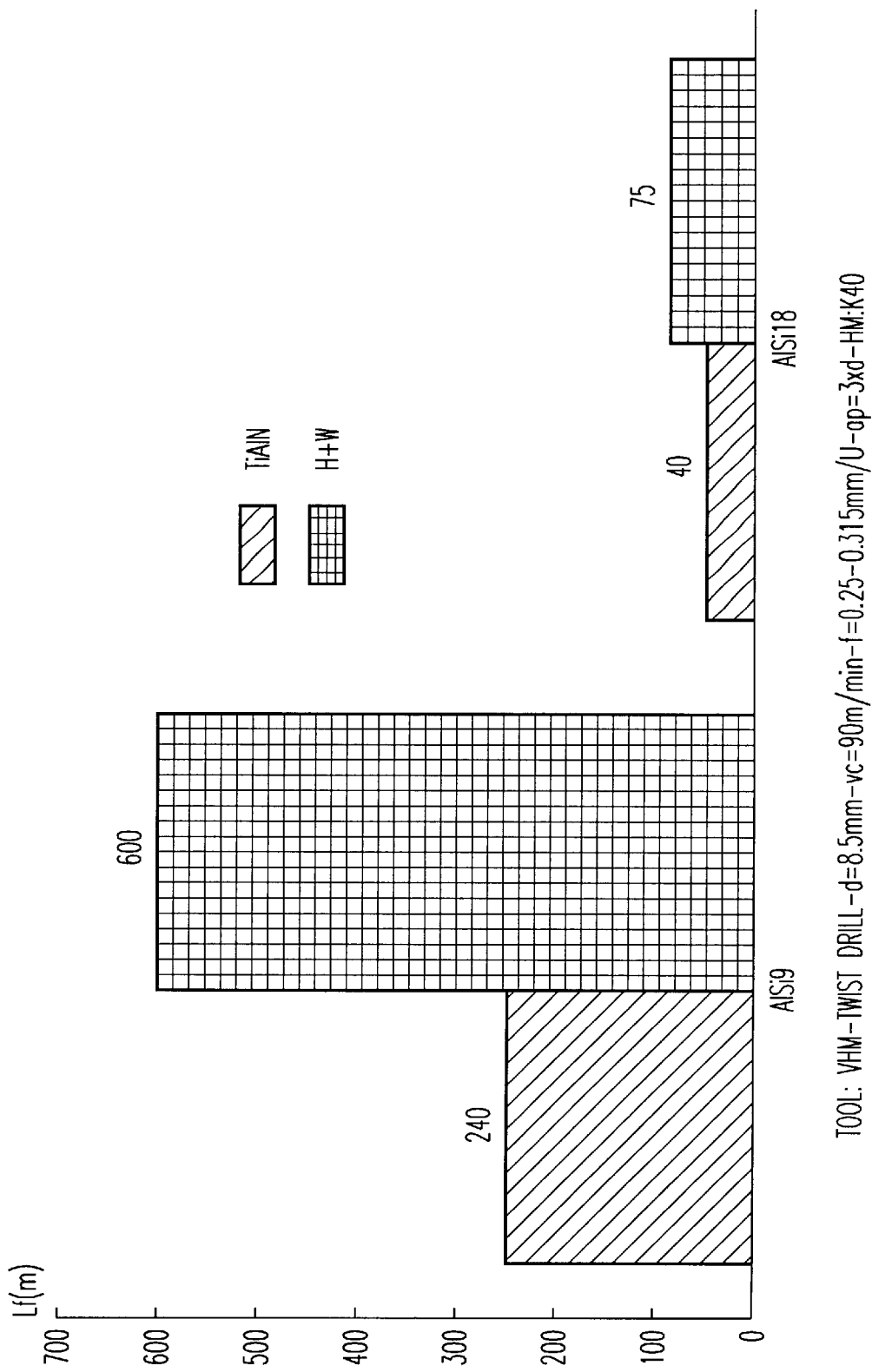
FIG. 6 is a diagram comparing a conventional cutting tool with a cutting tool provided with a slide layer.

As is further indicated in FIG. 1 by dot-dash lines, the drill 1 and especially the cutting member 2 are coated with a slide layer 20 which is not applied, however, in the area of the major cutting edges 8, 9. The slide layer 20 preferably comprises sulphides, solenides, tellurides, such as, e.g., $MoS_2$, $NbS_2$, $TaS_2$, $WS_2$, $MoSe_2$, $NbSe_2$, $TaSe_2$, $WSe_2$, $MoTe_2$, $NbTe_2$, $WTe_2$ or mixed compounds thereof. When applying such slide layer 20 the areas of the bit 6 indicated by dot-dash lines were covered by an adequate material so that the major cutting edges 8, 9 are constituted by a harder material. Regarding further details about the slide layer 20, the following FIGS. 3 and 6 are referred to.

Figure 2:
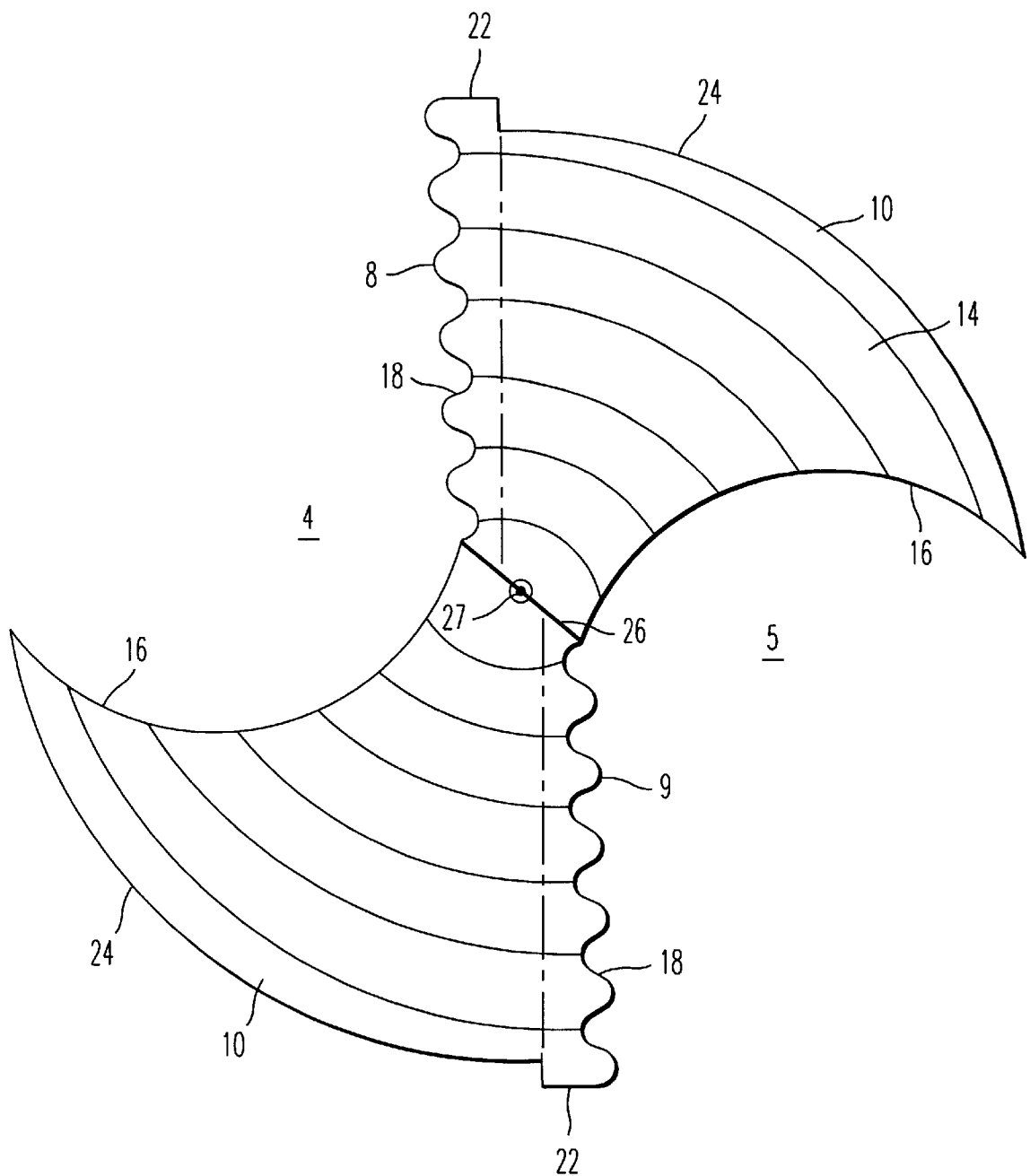
FIG. 2 is a diagrammatic top view on a bit of a drilling tool.

FIG. 2 shows a schematic top view on the bit 6 of the drill 1, wherein merely the faces of the drill bit 6 are represented, whereas the minor cutting edges of the drill rotating outside the plane of projection have been omitted.

As one can take from this view, the two open faces 10, which are confined in the view according to FIG. 2 an the one hand by the major cutting edges 8 and 9 and, on the other hand, by the rear edges 16, are formed by the two flutes 4, 5. The radially outer confinement of the open faces 10 is effected by the minor cutting edges 22 and the minor open faces 24. The two major cutting edges 8, 9 are connected by the chisel edge 26 extending through the axis 27 of the drill, On each open face 10 the recesses 14 are incorporated, as mentioned already before, which are formed in the illustrated embodiment as segments of a circle or spiral concentrical with respect to the axis 27 of the drill 1. Each of the circular lines shown in FIG. 2 represents the bottom of a recess 14. According to FIG. 2, moreover the grooves 18 extending approximately perpendicularly to the plane of projection along the flutes 4, 5 are formed in the faces of the flutes 4, 5 (perpendicular to the plane of projection). Both the grooves 18 and the recesses 14 have an approximately undulated or U-shaped cross-section so that the major cutting edges 8, 9 are formed in wave shape. The depth and width of the grooves 18 and/or the recesses 14 is approx. between 0.01–2 mm, preferably 0.02–0.5 mm, depending on the individual case.

The slide layer 20 mentioned at the beginning is not formed in the area of the major cutting edges 8, 9 so that only the areas between the dot-dash fine in FIG. 2 and the rear edges 16 of the open faces 10 are covered with the slide layer 20.

In special cases of application it may also be of advantage to extend the slide layer 20 to the cutting edges 8, 9.

Due to the wave shape of the faces 12 of the flutes 4, 5 and the open faces 10, the supply of coolant/lubricant—if used—to the major cutting edges 8, 9 is considerably improved so that the wear of the drill 1 can be substantially reduced or else the amount of coolant can be reduced. Moreover, the undulated structure of the flute entails an earlier chip breakage so that—as already mentioned in the beginning—comparatively short discontinuous chips are formed which ensure a high surface quality and, at the same time, can easily be discharged.

Figure 5:
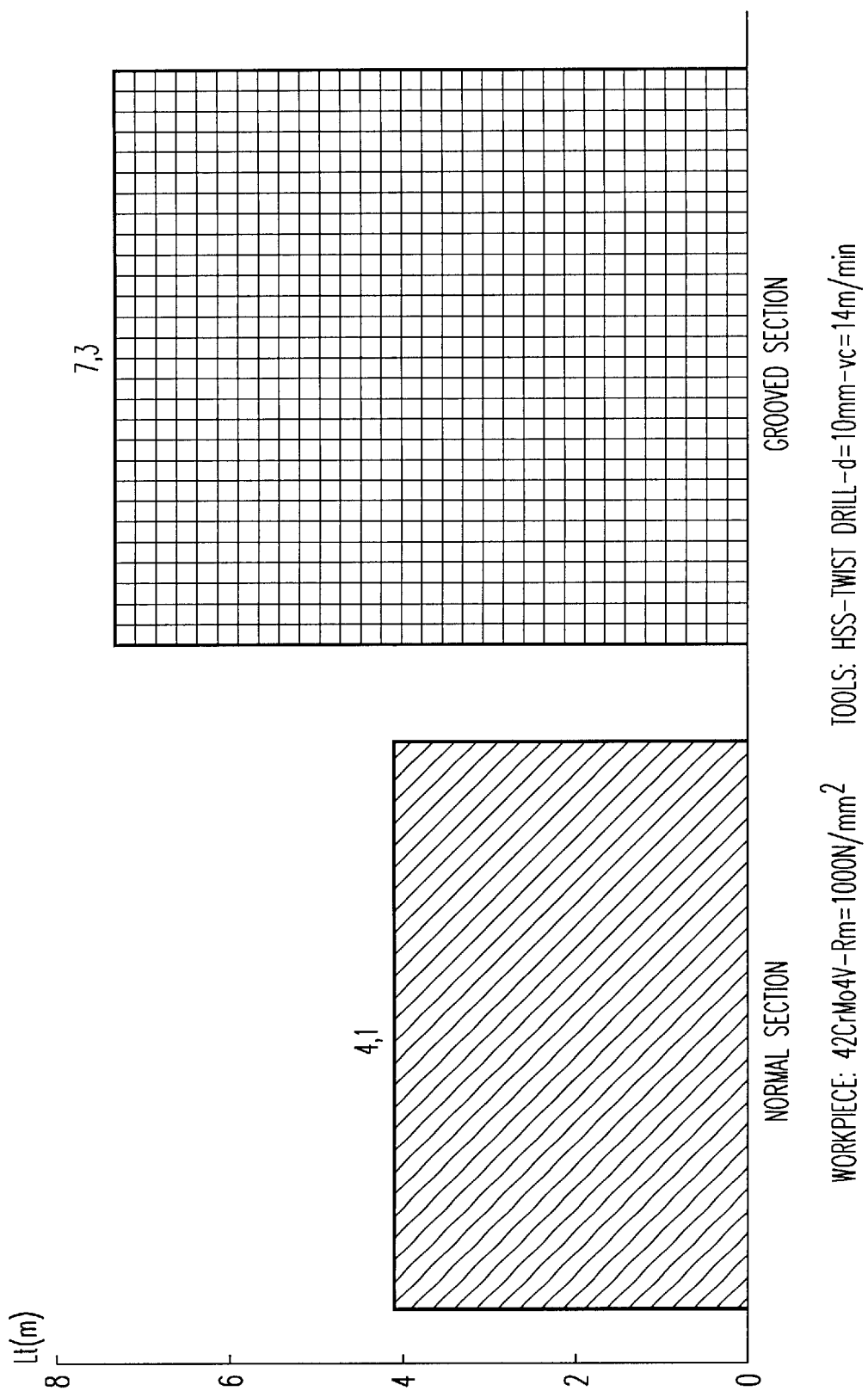
FIG. 5 is a diagram comparing a conventional cutting tool with a cutting tool according to the invention.

The superiority of this "grooved section", as it is called, vis-a-vis the conventional ground sections is emphasized in FIG. 5. This is a comparison of the tool life travel of two twist drills, one of which was provided with a plane open face and a planar face or flute, while the comparison tool was provided with the grooved section according to the invention at the flutes 4, 5 and the open faces 10. A workpiece of 42CrMo4V was machined by both drills, wherein the two drills were not provided with the above-mentioned slide layer 20, Both twist drills had identical geometrical dimensions—apart from the grooved section —and were operated at the same cutting speed $v_c$, the same feed f and the same cutting depth $a_p$.

As one can take from FIG. 5, solely by providing the grooved section the tool life travel can be substantially improved compared to conventional tools so that the tool lives and the maximum obtainable cutting speeds of the tools according to the invention are superior to those of conventional tools especially in the case of dry machining or in the case of machining with a reduced amount of coolant/ lubricant.

FIG. 3 represents a three-dimensional view of a drilling tool, wherein, for the sake of clarity, the grooves 18 in the flutes 4, 5 are indicated as dashed lines in the area of the major cutting edges 8, 9. The recesses 14 in the open faces 10 are indicated merely as dot-dash lines, because by way of FIG. 3 the coating of the drill 1 is to be illustrated.

The base body of the drill may be manufactured of conventional HSS steel, for instance, wherein either the entire drill or, as indicated in FIG. 3, merely the cutting member 2 is provided with a hard base layer 26. This base layer 26 may consist, e.g., of a hard ceramic material such as TiN, TiAlN, TiCN or of diamond etc. As mentioned already at the beginning, the PVD coating method is not discussed here, to simplify matters, but reference is made to the relevant literature and, in particular, to the respective patent application of VILAB.

The base layer 26 extends to the major cutting edges 8, 9, wherein in FIG. 3 the hatching indicative of the base layer 26 was not effected in the area of the major cutting edges 8, 9.

On the base layer 26 the aforementioned slide layer 20 is formed which is indicated by a grey shading in FIG. 3. This slide layer 20 is preferably prepared on the basis Of sulphide, selenide or telluride and thus has certain lubricating characteristics which will be explained in more detail in the following. The slide layer 20 does not extend over the entire cutting maker 2, but ends at a distance from the major cutting edges 8, 9 so that the latter are formed by the hard wear-resisting base layer 26. I.e., the actual cutting area of the drill 1 is covered by the hard base layer 26, which may have, for instance, a Vickers pyramid hardness of approx. 2000–10000 HV, while the other areas of the cutting member 2, which do not directly contribute to the machining operation, are covered with the comparatively soft slide layer 20 which may have, for instance, a Mohs' hardness of 1–2.

In particular cases, the slide layer 20 may also be applied directly to the base body so that the same constitutes the base layer.

Figure 4:
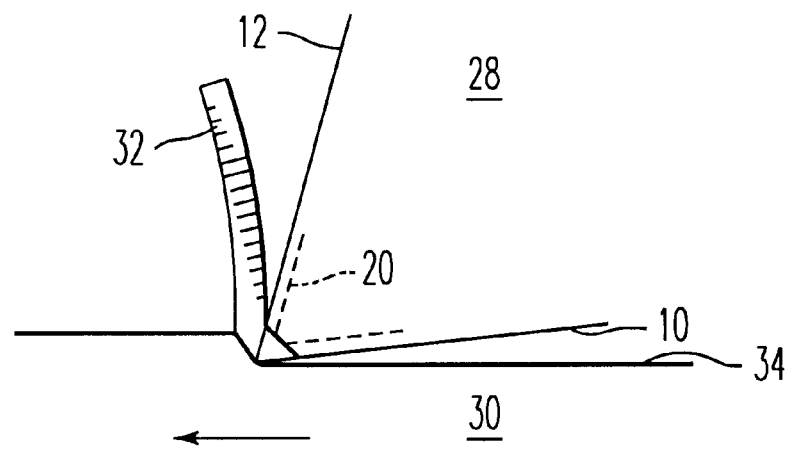
FIG. 4 is a schematic diagram for explaining the chip formation in a cutting tool according to the invention.

In order to illustrate the effect of this slide layer 20, FIG. 4 shows a sectional view of a cutting edge 28 of a cutting tool during the machining operation. A chip 32 is removed from a workpiece 30 by the feed motion in the direction of the arrow, the cutting edge 29 being formed by the hard and wear-resisting base layer 26 in the area where the actual machining of the workpiece 30 is performed. The chip is removed along the face 12 and thus moves on the slide layer 20 indicated as dashed line which supports the gliding of the chip along the face 12 due to its sliding effect ($MoS_2$ ... ). In this way, the removal of the chip from the actual machining area is supported so that, on the one hand, the chip and thus also thermal energy can rapidly be discharged from the workpiece and, on the other hand, the face wear is minimized due to the special structure, i.e. a hard base layer 26 in the cutting area and a soft slide layer 20 in the discharging area of the flutes 4, 5, and the formation of a built-up edge is prevented.

Moreover, by producing the slide layer 20 on the open face 10 of the tool, the friction thereof with the machined surface 34 of the workpiece 30 is minimized so that also the wear of the open face in the area of the cutting edges can be reduced to a minimum. Hence by providing the slide layer 20 the wear of the tool can be substantially reduced compared to conventional tools having no slide layer 20.

Such tools are thus especially advantageous when used for dry machining or for the machining with a reduced amount of coolant of light metals (aluminium/magnesium alloys) which becomes increasingly important in the automotive and aviation industry. When coolants and lubricants are dispensed with or reduced, one the one hand considerable investment costs can be saved, on the other hand the recycling or waste disposal of such coolants/lubricants represents a problem which likewise constitutes an increasingly important cost factor in view of strict legislative impositions.

The superiority of coated tools to uncoated tools can be explained by way of the comparative tests represented in FIG. 6. These tests were carried out with a TiAlN-coated twist drill, the tests being executed on the basis of identical machining parameters (cutting speed, feed, cutting depth). The test series shown on the left of FIG. 6 was carried out with a workpiece made of AlSi9, wherein an almost tripled tool life travel was achieved by the tool provided with a hard base layer and a soft slide layer (H+S).

The same result was obtained also with an Al alloy having a higher silicon content (AlSil8), wherein although on the whole lower values were achieved due to the worse machinability of this material, the coated tool, however, exhibited a considerably longer tool life travel with otherwise equal test conditions.

I.e. by providing the soft slide layer on a hard base layer or a hard base body of a tool the tool life and thus also the maximum possible cutting speeds can be substantially improved compared to conventional tools. Optimum results can be achieved, when the tool as represented in FIGS. 1 and 3 is provided both with a grooved section and with a soft slide layer, wherein it may be advantageous in individual cases to provide solely either of the described improvements (grqoved section or slide layer).

When forming the grooves 18 and the recesses 14, radii (depths and widths) ranging from 0.01–2 mm, preferably 0.02–0.5 mm, are preferred. Such grooves 18 and recesses 14 can be produced during grinding the flutes an the drill bit, resp., in one working cycle so that no separate grinding operations and tools are necessary for providing the grooves/recesses.

The slide layer 20 can be prepared by ion sputtering so that this layer is not only applied to the surface of the base layer 26 but also partly diffuses into the base layer.

The invention is not restricted to the use with drilling tools, of course, but the grooved section according to the invention and/or the slide layer according to the invention are also applicable to other cutting tools, preferably to those having a geometrically defined cutting face.

What is claimed is:

1. A cutting tool, comprising:
a cutting member including,
a base body defining at least one open face and at least one flute intersecting to form at least one cutting edge configured to splinter material off a workpiece,
said open face and said flute including plural adjacent groove-shaped recesses; forming a continuous undulating cross section at said cutting edge, and
a slide layer formed on at least a portion of said base body and having a lower hardness than said base body.

2. A cutting tool according to claim 1, wherein said slide layer comprises a sulfide, a selenide, a telluride, or a mixed combination thereof.

3. A cutting tool according to claim 2, wherein said slide layer includes a material selected from the group consisting of $MoS_2$, $NbS_2$, $TaS_2$, $WS_2$, MoSe2, $NbSe_2$, $TaSe_2$, $Wse_2$, MoTe2, $NbTe_2$, $Wte_2$, and mixed compounds thereof.

4. A cutting tool according to claim 1, wherein said base body of said cutting member comprises a material selected from the group consisting of high speed steel (HSS), a hard alloy, cermit and ceramic.

5. A cutting tool according to claim 1, wherein said slide layer is not provided in the area of said cutting edge.

6. A cutting tool according to claim 1, wherein a thickness of said slide layer is between 0.01–5 µm.

7. A cutting tool according to claim 1, wherein the hardness of said slide layer is between 1–2 on the Mohs' hardness scale.

8. A cutting tool according to claim 1, wherein said plurality of adjacent groove shaped recesses of said open face extend away from said cutting edge toward a rear edge of said open face.

9. A cutting tool according to claim 6, wherein said cutting edge is formed on a front edge of said open face and said groove shaped recesses of said open face are arranged in an approximately concentric relationship relative to a lengthwise axis of said cutting tool.

10. A cutting tool according to claim 7, wherein said groove shaped recesses of said open face are segments of a circle or spiral.

11. A cutting tool according to claim 1, wherein said groove shaped recesses of said flute are formed such that an axis of said groove shaped recesses of said flute run approximately parallel to an axis of said flute.

12. A cutting tool according to claim 9, wherein said groove shaped recesses of said open face form an approximately undulatory cross section.

13. A cutting tool according to claim 9, wherein one of said plurality of groove shaped recesses of said open face is allocated to one of said plurality of groove shaped recesses of said flute, respectively, with said one groove shaped recess of said open face forming an extension of said one groove shaped recess of said flute.

14. A cutting tool according to claim 1, wherein said groove shaped recesses of said open face and said groove said recess of said flute extend away from said cutting edge and run across only a partial section of at-least one of said flute and said open face.

15. A cutting tool according to claim 1, wherein the width and depth of said groove shaped recesses of at least one of said open face and said flute is 0.01–2 mm.

16. A cutting tool according to claim 1, wherein the width and depth of said groove shaped recesses of at least one of said open face and said flute is 0.02–0.5 mm.

17. A cutting tool, comprising:
a cutting member, including
a base body defining at least one open face and at least one flute intersecting at least one cutting edge configured to splinter material off a workpiece,
said open face and said flute including plural adjacent groove-shaped recesses forming a continuous undulating cross section at said cutting edge,
a base layer formed on at least a portion of said base body, and
a slide layer formed on at least on at least a portion of at least one of said base layer and said base body, said slide layer having a lower hardness than said base layer and said base body.

18. A cutting tool according to claim 17, wherein said slide layer comprises a sulfide, a selenide, a telluride, or a mixed combination thereof.

19. A cutting tool according to claim 18, wherein said slide coating layer includes a material selected from the group consisting of $MoS_2$, $NbS_2$, $TaS_2$, $WS_2$, $MoSe_2$, $NbSe_2$, $TaSe2$, $Wse_2$, $MoTe_2$, $NbTe_2$, $Wte_2$, and mixed compounds thereof.

20. A cutting tool according to claim 17, wherein said base body of said cutting member comprises a material selected from the group consisting of high speed steel (HSS), a hard alloy, cermit and ceramic.

21. A cutting tool according to claim 17, wherein said base layer comprises a ceramic material.

22. A cutting tool according to claim 21, wherein said base layer includes a material selected from the group consisting of TiN, TiAlN, TiCN, and diamond.

23. A cutting tool according to claim 17, wherein said slide layer is not provided in the area of said cutting edge.

24. A cutting tool according to claim 17, wherein a thickness of said base layer is between 1–10 $\mu$m.

25. A cutting tool according to claim 17, wherein a thickness of said slide layer is between 0.01–5 $\mu$m.

26. A cutting tool according to claim 17, wherein a thickness of said base layer is between 1–10 $\mu$m and a thickness of said slide layer is between 0.01–5 $\mu$m.

27. A cutting tool according to claim 17, wherein the hardness of said base layer is between 1,000 and 10,000 HV and the hardness of said slide layer is between 1–2 on the Mohs' hardness scale.

28. A cutting tool according to claim 17, wherein the hardness of said base layer is between 2,000 and 4,000 HV and the hardness of said sliding layer is between 1–2 on the Mohs' hardness scale.

29. A cutting tool according to claim 17, wherein a plurality of adjacent groove shaped recesses of said open face extend away from said cutting edge toward a rear edge of said open face.

30. A cutting tool according to claim 26, wherein said cutting edge is formed on a front edge of said open face and said groove shaped recesses of said open face are arranged in an approximately concentric relationship relative to an axis of said cutting tool.

31. A cutting tool according to claim 27, wherein said groove shaped recesses of said open face are segments of a circle or spiral.

32. A cutting tool according to claim 17, wherein said groove shaped recesses of said flute are formed such that an axis of said groove shaped recesses run approximately parallel to an axis of said flute.

33. A cutting tool according to claim 30, wherein said groove shaped recesses of at least one of said open face and said flute form an approximately undulatory cross section.

34. A cutting tool according to claim 30, wherein one of said plurality of groove shaped recesses of said open face is allocated to one of said plurality of groove shaped recesses of said flute, respectively, with said one groove shaped recess of said open face forming an extension of said one groove shaped recess of said flute.

35. A cutting tool according to claim 17, wherein said groove shaped recesses of said open face and said groove shaped recess of said flute extend away from said cutting edge and run across only a partial section of at least one of said open face and said flute.

36. A cutting tool according to claim 17, wherein the width and depth of said groove shaped recesses of at least one of said open face and said flute is 0.01–2 mm.

37. A cutting tool according to claim 17, wherein the width and depth of said groove shaped recesses of at least one of said open face and said flute is 0.02–0.5 mm.

* * * * *